June 7, 1938.  E. V. VARLEY  2,119,660
SLICING MACHINE
Filed Sept. 22, 1936  3 Sheets-Sheet 1

INVENTOR
ERNEST V VARLEY
BY Raymerth
ATTORNEYS

June 7, 1938.     E. V. VARLEY     2,119,660
SLICING MACHINE
Filed Sept. 22, 1936     3 Sheets-Sheet 3
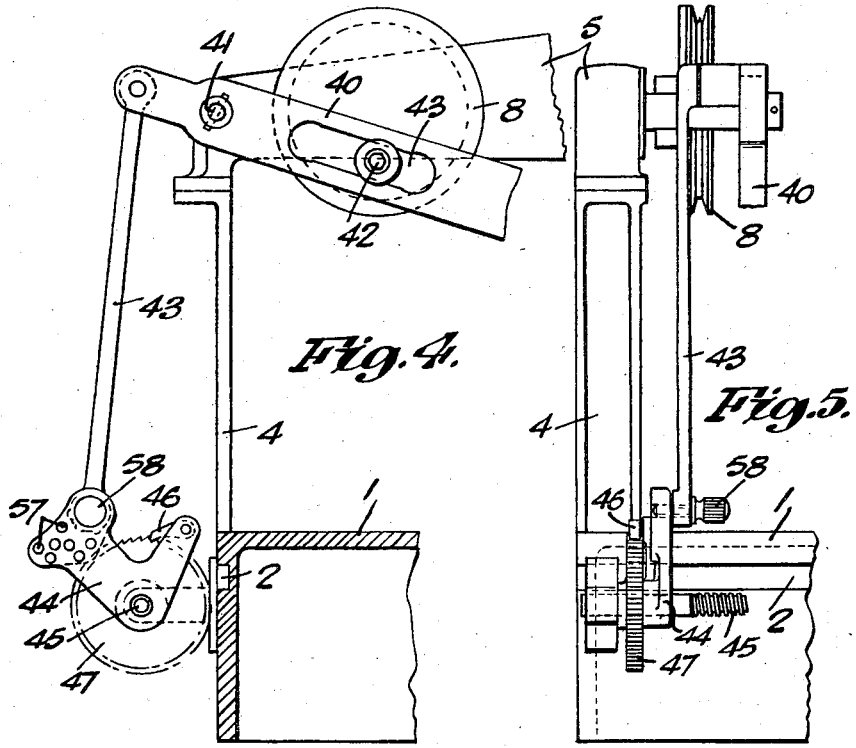
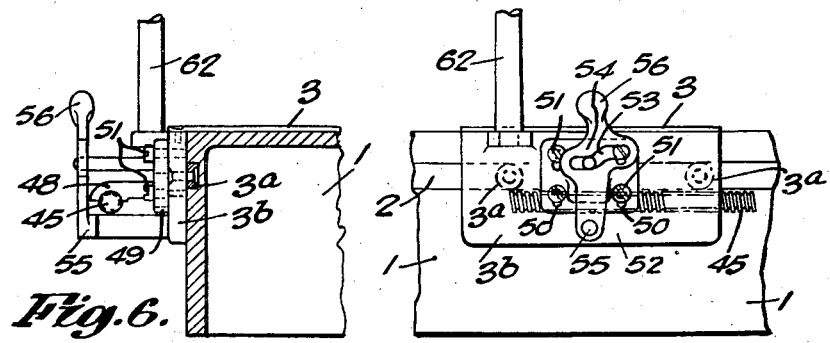
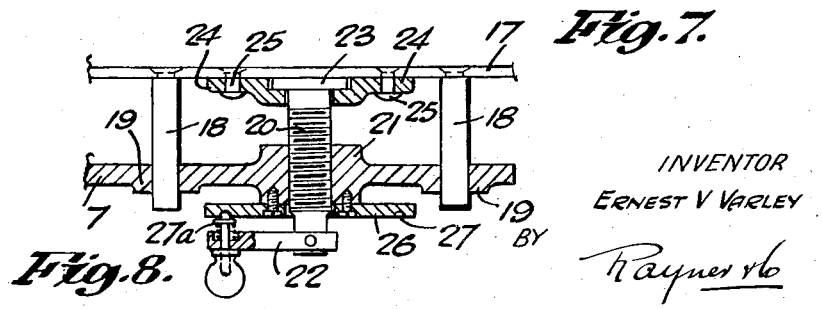
INVENTOR
ERNEST V VARLEY
BY
Rayner &co
ATTORNEYS Patented June 7, 1938

2,119,660

UNITED STATES PATENT OFFICE 2,119,660

SLICING MACHINE

Ernest Vernon Varley, Norbury, London, England, assignor to Merridale Trust Limited, London, England Application September 22, 1936, Serial No. 101,971
In Great Britain September 30, 1935

4 Claims. (Cl. 146—103)

This invention relates to machines for slicing meats and other edibles constituted so that they may be cut into slices, and more particularly the present invention relates to slicing machines of the type in which a rotary knife is mounted so that it can be moved to and fro across the substance to be sliced. The object of this invention is to improve upon slicing machines of this type in such manner that the substance to be sliced is readily held during successive cutting operations with one face occupying a predetermined relationship to a cutting plane to obtain uniformity of thickness of the slices, and also to minimize the labour required in operating the machine. Another object of this invention is to simplify the driving mechanism for rotating the knife and for imparting to and fro movements thereto so as to obviate independent driving means for effecting the rotation and reciprocation of the knife.

According to this invention a slicing machine comprises a frame with a supporting base for the meat or other substance, a rotary knife, an abutment plate for the substance to be cut located in a plane parallel with and close to the rotary knife, and means for rotating the knife and for moving the knife and plate translatively in unison to and fro across the substance to be cut.

Summarized, one form of this invention comprises an oscillating beam mounted on a frame and carrying a rotary disc blade and a locating plate parallel with the plane of the knife and located close to and extending beyond the part of the peripheral track of the knife which engages and cuts the meat or the like, a carriage for the meat or the like opposed to one face of said plate, driving means common to said blade and beam for rotating the former and oscillating the latter simultaneously, means for transferring the drive to feeding mechanism for automatically feeding said carriage towards said locating plate by a progression of movements, means for varying the space between the cutting plane of the knife and the plane of said locating plate to vary the thickness of the slices, and means for correspondingly adjusting the amount of each said movement of said carriage towards said locating plate.

In order that this invention may be clearly understood and readily carried into effect three sheets of drawings are appended hereto illustrating an embodiment thereof, and wherein:—

Fig. 4 is a detail front elevation view showing the means for advancing the base plate on which the meat is supported.

Fig. 5 is an end elevation of Fig. 4.

Fig. 6 is a detail end elevation of one side of the said base plate showing means for disconnecting the drive of the feeding mechanism from such plate.

Fig. 7 is a front elevation of Fig. 6.

Fig. 8 is a detail sectional plan view showing a suitable device for adjusting the said locating plate relatively to the knife for the purpose of varying the thickness of slice; and Fig. 9 is a detail plan view showing a slight modification of the transmission mechanism in which gearing is partly employed instead of belt and pulley drive.

Figure 1:
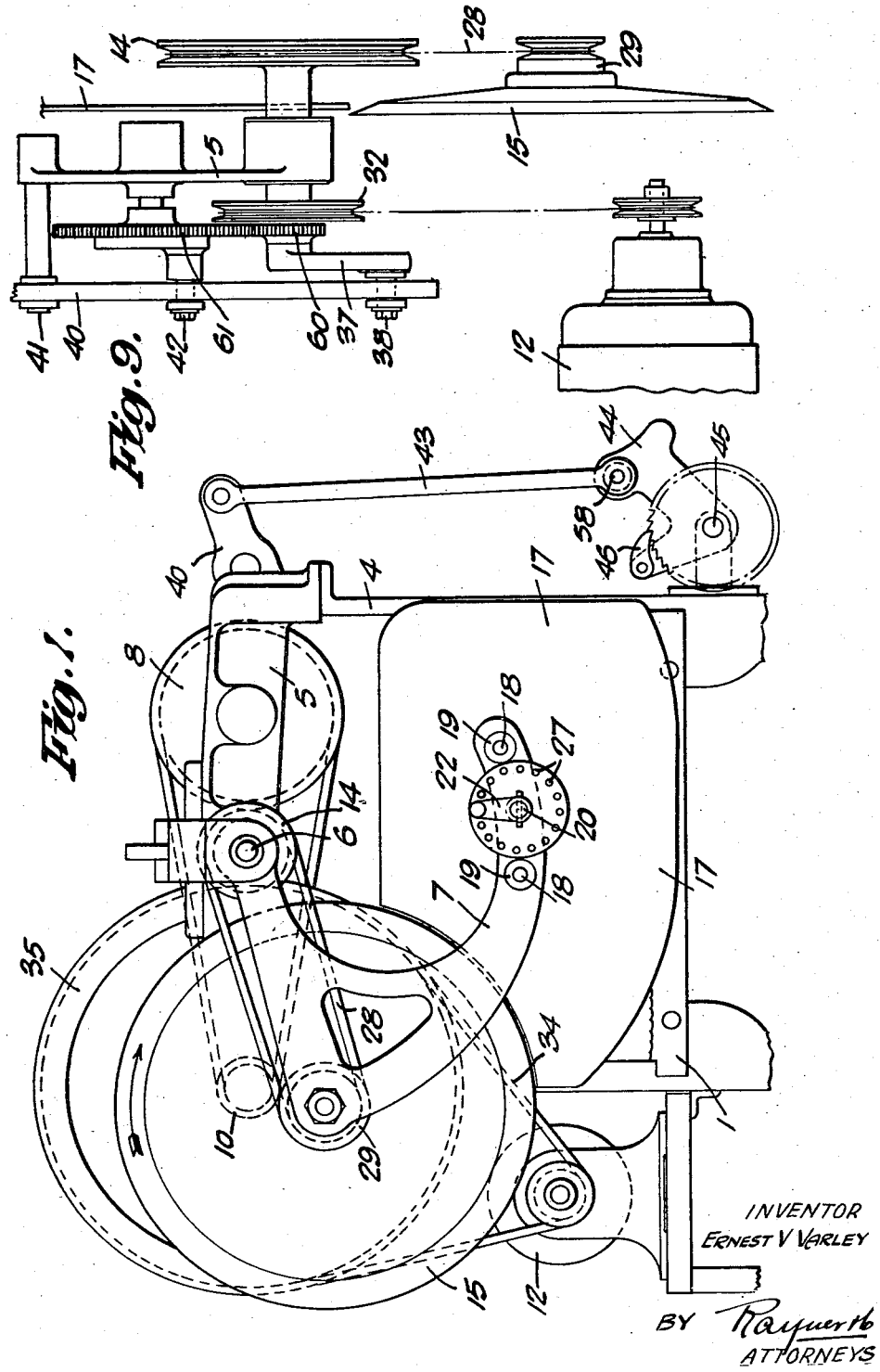
Fig. 1 is an end elevation view of a machine looking at the side opposite to that on which the meat or other substance is placed.

Referring to the drawings the frame of the machine comprises a base 1 channelled longitudinally in its side walls as at 2 to slidably support rollers 3a carried by depending side bars 3b of a meat carriage 3. Upstanding arms 4 carried by the base support at their upper ends a bridge 5 in which are supported overhead a bearing for a shaft 6 of an oscillating beam 7, a shaft 8a carrying a pulley 8 for operating means to oscillate the said beam, and a shaft 9 carrying pulleys 10 and 11 for transmitting the drive from an electric motor 12 to the shaft 8a and also to a tubular shaft 13 carrying a pulley 14 adapted to drive a rotary knife 15 carried by the beam 7.

The beam 7 is a substantially V shaped arm fixed at the end of one limb to the shaft 6 and carrying at its elbow or apex of the V a pin 16 on which the knife 15 rotates. The other limb is preferably bowed as shown and has secured to it a locating plate 17 against which the meat is pressed during slicing. This locating plate is parallel with and close to the plane of the cutting edge of the knife 15, but it is adjustable in relation thereto in order to enable the thickness of slice to be varied. For this purpose the plate 17 has fixed to it a parallel pair of guide pins 18 (see Fig. 8) slidable in bosses 19 in the beam 7, and the plate 17 also carries between these guide pins a short feed screw 20 fitted with a handle 22 at its free end and threaded through a boss 21 on the beam 7 whereby the plate 17 can be displaced in a finely adjustable manner relatively to the beam 7. The feed screw 20 can be supported for rotation by engaging a flanged head 23 thereof under a pair of overhanging clamps 24 secured by rivets 25 to the plate 17. The extent of adjustment of the plate 17 can be indicated by fixing to the beam 7 about the feed screw a disc 26 formed with a plurality of recesses 27 in which trips a spring detent member 27a mounted in the handle 22. These recesses 27 may be suitably graduated for indicating the thickness of slice which of course depends upon the amount of adjustment of the locating plate 17 relatively to the knife 15.

When the meat is placed on the sliding carriage 3 preparatory to slicing it, the meat is pressed against the locating plate 17 and the motor 12 is started, resulting in the knife 15 being rotated and the beam caused to swing to bring the rotating knife into engagement with the meat, the plate 15 sliding across the face of the meat in advance of the knife. The knife rotates in the direction of the arrow (Fig. 1), i. e. counter to the direction of swing of the beam 7, with the result that the knife cuts into the meat downwards, and the direction of rotation of the knife is complementary to its direction of movement of translation resulting in a clean cut of the meat, and preventing dragging of the knife on the meat when the knife is swung back preparatory to a further slicing action.

The knife is driven by means of a belt 28 passed round a pulley 29 fixed to the rear face of the knife, and the beforementioned pulley 14 on the tubular shaft 13. The latter rotates freely about the shaft 6 and is supported in bearings 30 in a boss 31 on the bridge 5, the end of this tubular shaft 13 remote from the end with the pulley 14 having a pulley 32 fixed thereon. Over this latter pulley is passed a driving belt 33 which is also passed over the pulley 11 formed integral with the pulley 10 rotating on bearing 36 carried by the shaft 9. The pulleys 10 and 11 are driven from the motor 12 by belt 34 and pulley 35.

The beam 7 is oscillated by means of a crank 37 at one end of the shaft 6, this crank carrying a roller or bearing 38 at its free end slidable in a slot 39 in one end of a lever 40 fulcrumed near its other end on a pin 41 projecting laterally from the bridge 5. This lever 40 is rocked up and down about the pin 41 by the action of a pin 42 projecting crank fashion from the pulley 8 into a further slot 43 in the lever 40. This lever 40 is also utilized to actuate means for progressively feeding the carriage 3 towards the locating plate 17, for which purpose the lever 40 is prolonged outwardly beyond the pivot 41 to receive the upper end of a vertical link 43 the lower end of which is connected to one limb of a V shaped lever 44 freely oscillatable at its corner upon one end of a feed screw 45 (Figs. 4 and 5). The other limb of this V shaped lever carries a pawl 46 which engages the teeth of a ratchet wheel 47 fixed on the feed screw 45. This feed screw is in threaded engagement with a half-nut 48 (Figs. 6 and 7) projecting fixedly from a plate 49 carried by one side of the carriage 3. It is preferred to be able to raise the nut 48 from the screw 45 for the purpose of freeing the carriage 3 for quick sliding adjustment, and this is effected by forming two pairs of slots 50 in the plate 49 and engaging therein four screws 51 threaded into the depending side plate 3b of the carriage 3. The plate 49 can be raised by a cam slot 53 in a catch 54 pivoted at one end 55 to the block 52 and formed with a finger piece or knob 56 at its other end for engagement by the operator. This finger piece or knob 56 is also engaged by a stop on the frame 1 when the leading edge of the carriage reaches a position close to the locating plate 17, to automatically free the carriage from the action of the feed screw, and thereby preventing the carriage from fouling the knife.

The degree of movement of the V shaped lever 44 at each movement can be varied in order to ensure feeding the carriage 3 at each movement a distance corresponding to the setting of the locating plate 17 relatively to the knife. A suitable method of effecting this adjustment is to provide a plurality of apertures 57 in the lever 44 for the selective reception of a pivot pin 58 passed through the lower end of the link 43. The spacing of these apertures is such that a different angle of movement is applied to the lever 44 for each operation 57 when fitted with the pin 58, and these apertures are distinguishingly marked to correspond in number and setting with the recesses 27 in the disc 26. If desired the adjustment of the pin 58 can be automatic with the adjustment of the detent 27a, by suitably connecting the two, e. g. by a Bowden wire, the pin 58 being slidable against the influence of a coiled compression spring in a slot in the lever 44, instead of engaging it in separate apertures.

Figure 2:
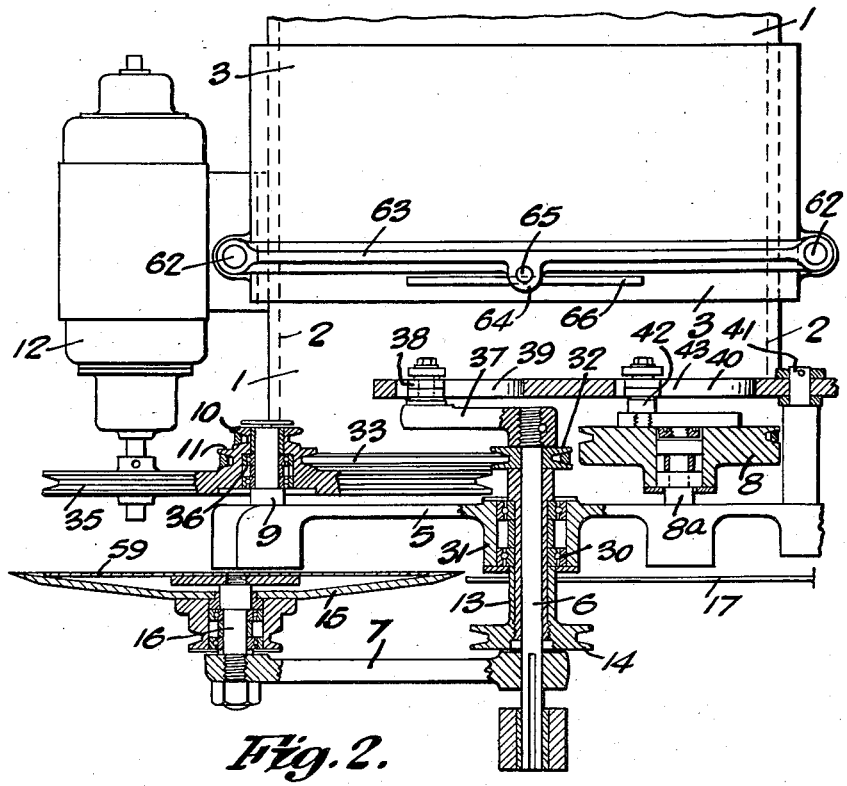
Fig. 2 is a sectional plan view of the machine.
Figure 3:
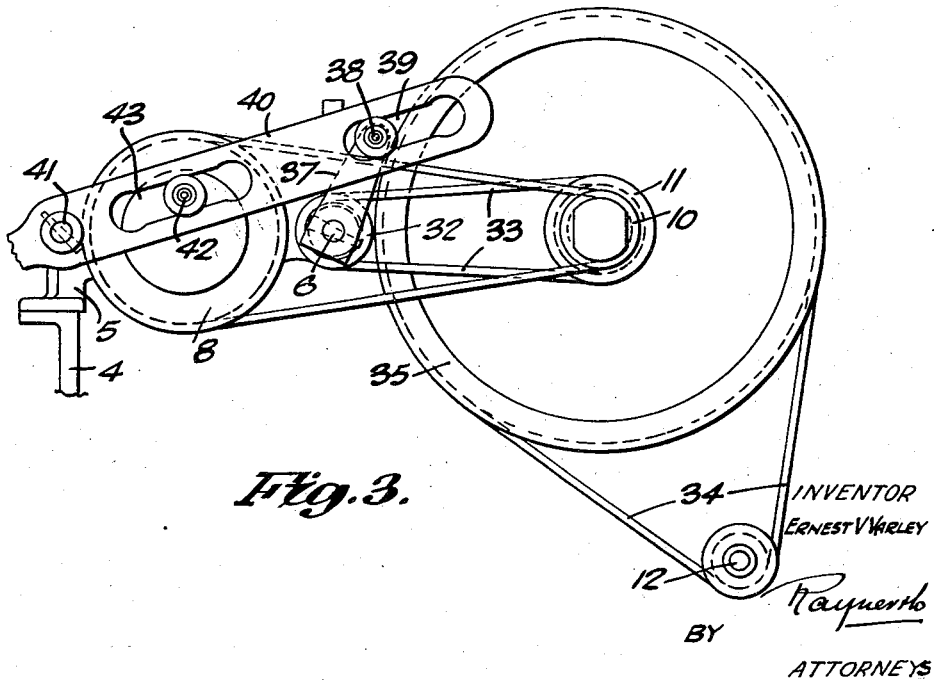
Fig. 3 is a detail front elevation view of the mechanism for oscillating the beam carrying the knife and the locating plate.

To facilitate passage of the knife across the meat, the knife (see Fig. 2) is dished and fitted within its dished space with a disc 59 which is either fixed to the pin 16 as shown, or may be loose thereon so that the knife rotates relatively to the disc 59 which thereby ensures that the predominating area of the trimmed surface of the meat presses against a non-rotating surface, resulting in a clean cut of the meat.

To minimize the number of pulleys the pulley of the motor 12 can drive directly on to the pulley 32 on the hollow shaft 13, as shown in Fig. 9, and this shaft 13 can carry a gear wheel 60 meshing with a gear wheel 61 taking the place of the pulley 8.

The carriage 3 slides upon the upper surface of the base 1 and consequently the meat can be placed upon the base 1 and pushed forwards by the sliding carriage, e. g. when slicing a small piece of meat. When slicing a large joint of meat, the joint can be placed on the sliding carriage, and if desired means can be provided to hold the joint down on the carriage, although the direction of rotation and translative movement of the knife assists in holding the meat down during slicing. A device for holding the meat down can comprise a pair of uprights 62 on the carriage 3 slidably supporting the ends of an overhead bar 63 having a lateral centre lug 64. In the centre of this lug is threaded a vertical pin 65 carrying at its lower end a plate 66 adapted to be pressed against the meat. This plate is supported by the lower end of the screw 65 in such manner that it (the plate) can be angularly adjusted relatively to the pin 65, so that the plate can press upon the top of a joint and conform to any irregularity in shape of the joint, and also when the carriage is utilized to push the substance to be sliced across the top of the base 1, the plate 66 can be inclined so as to bear against the rear end of the article of food being sliced.

I claim:—

1. Slicing machine comprising a frame, a beam oscillatable thereon, a rotary disc knife and a locating plate carried by said beam, said locating plate being parallel with the plane of the knife and located close to and extending beyond the part of the peripheral track of the knife which engages and cuts the meat or the like, a carriage for the meat or the like opposed to one face of said plate, driving means common to said blade and beam for rotating the former and oscillating the latter simultaneously, means for transferring the drive to feeding mechanism for automatically feeding said carriage towards said locating plate by a progression of movements, means for varying the space between the cutting plane of the knife and the plane of said locating plate to vary the thickness of the slices, and means for correspondingly adjusting the amount of each said movement of carriage towards said locating plate.

2. Slicing machine comprising a base, a bridge secured above said base, a shaft supported in said bridge, a V shaped beam fixed at the outer end of one limb to said shaft, a rotary knife supported at the elbow of said V shaped beam, a locating plate carried by the outer end of the other limb of the beam and in a plane parallel with the plane of the cutting edge of the knife, a crank at one end of said shaft, a lever, a pin and slot connection between the lever and said crank, a prime mover, a rotary member carried by said bridge driven by said prime mover, a projection on said rotary member, a slot in said lever engaged by said projection whereby the lever is rocked and the said shaft is oscillated by reason of said pin and slot connection of the crank to the lever and said beam is oscillated to carry the knife and locating plate across the substance to be sliced, a sliding carriage on the base to feed the substance towards the slicing zone, a feed screw adapted to slide said carriage relatively to the base, and means for operating the feed screw actuated from said lever.

3. Slicing machine comprising a base, a bridge secured above said base, a shaft supported in said bridge, a V shaped beam fixed at the outer end of one limb to said shaft, a rotary knife supported at the elbow of said V shaped beam, a locating plate carried by the outer end of the other limb of the beam and in a plane parallel with the plane of the cutting edge of the knife, a crank at one end of said shaft, a lever, a pin and slot connection between the lever and said crank, a prime mover, a rotary member carried by said bridge driven by said prime mover, a projection on said rotary member, a slot in said lever engaged by said projection whereby the lever is rocked and the said shaft is oscillated by reason of said pin and slot connection of the crank to the lever and said beam is oscillated to carry the knife and locating plate across the substance to be sliced, a sliding carriage on the base to feed the substance towards the slicing zone, a feed screw adapted to slide said carriage relatively to the base, an oscillating member supported adjacent to said feed screw, means connecting said oscillating member to said feed screw to effect a uni-directional drive of the feed screw, and a link operatively connecting said lever to said latter oscillating member.

4. Slicing machine comprising a base, a bridge secured above said base, a shaft supported in said bridge, a V shaped beam fixed at the outer end of one limb to said shaft, a rotary knife supported at the elbow of said V shaped beam, a locating plate carried by the outer end of the other limb of the beam and on a plane parallel with the plane of the cutting edge of the knife, a crank at one end of said shaft, a lever, a pin and slot connection between the lever and said crank, a prime mover, a rotary member carried by said bridge driven by said prime mover, a projection on said rotary member, a slot in said lever engaged by said projection whereby the lever is rocked and the said shaft is oscillated by reason of said pin and slot connection of the crank to the lever and said beam is oscillated to carry the knife and locating plate across the substance to be sliced, a sliding carriage on the base to feed the substance towards the slicing zone, a feed screw adapted to slide said carriage relatively to the base, an oscillating member supported adjacent to said feed screw, means connecting said oscillating member to said feed screw to effect a uni-directional drive of the feed screw, a link operatively connecting said lever to said latter oscillating member, and means for varying the point of connection of one end of said link to the appropriate member for varying the amount of each movement of the sliding carriage towards the cutting zone.

ERNEST VERNON VARLEY.